April 8, 1952      R. I. ROBINSON      2,592,070
VERTICAL SANITARY MOTOR
Filed Aug. 3, 1950
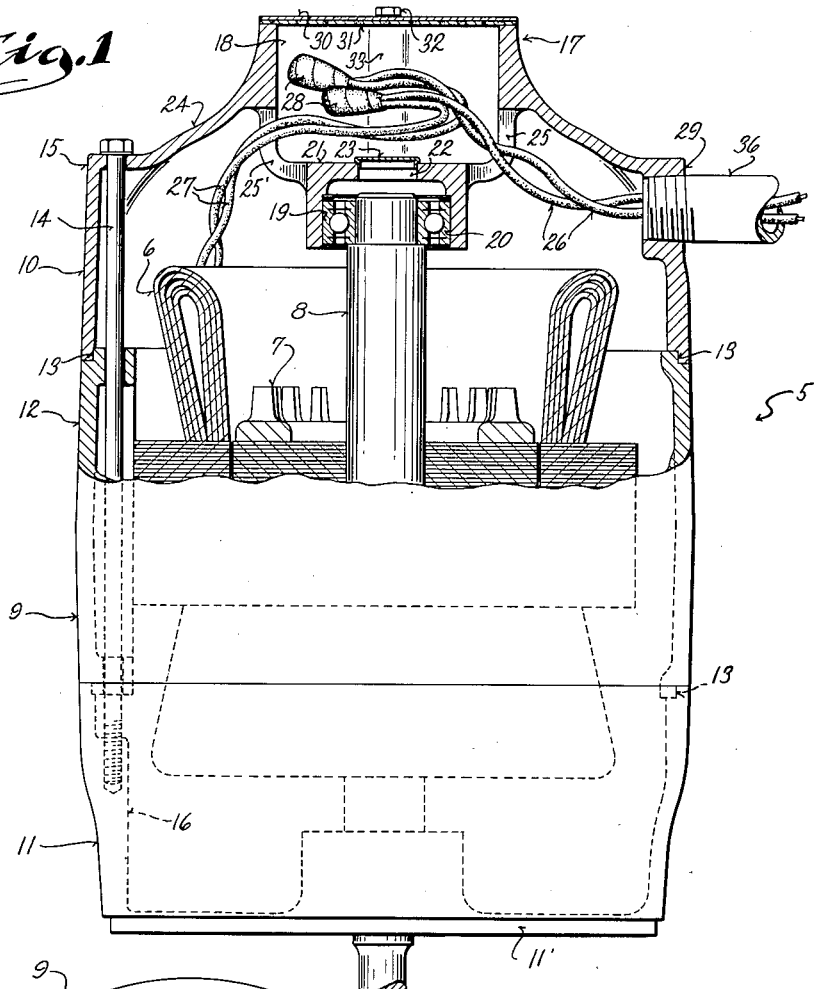
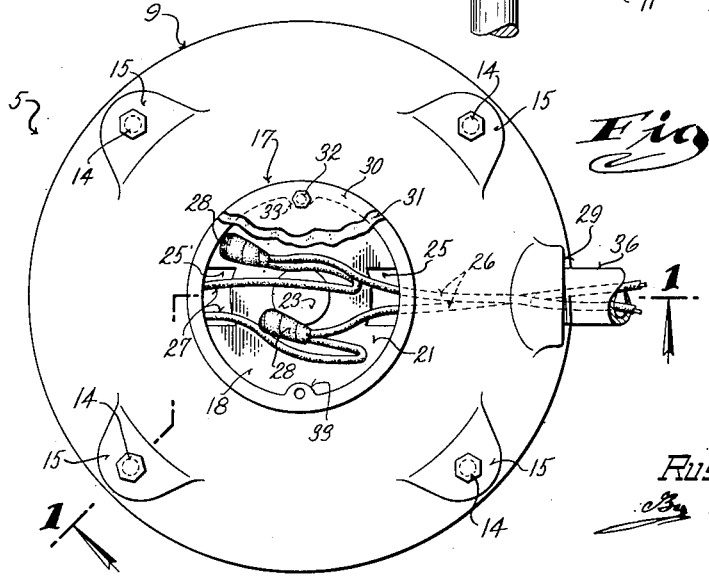
Inventor
Russell I. Robinson Patented Apr. 8, 1952

2,592,070

UNITED STATES PATENT OFFICE 2,592,070

VERTICAL SANITARY MOTOR

Russell I. Robinson, Milwaukee, Wis., assignor to The Louis Allis Company, Milwaukee, Wis., a corporation of Wisconsin Application August 3, 1950, Serial No. 177,431

3 Claims. (Cl. 172—36)

This invention relates to electric motors and refers more particularly to electric motors of the sanitary type.

For reasons of safety, all of the conductors which carry power to an electric motor are normally enclosed in metallic housings, and the junctions between conductors are housed in junction boxes having detachable covers to permit access to the connections. Thus the main power wires which supply current to a motor are brought to it in a conduit which connects to a junction box mounted on the motor frame or housing, and the leads connected with the motor windings inside the motor housing are also brought directly into this junction box, where the two sets of wires are spliced or otherwise connected together.

Motors used in the dairy industry and in other food processing operations must be of the sanitary type, having their exteriors so designed that there are no corners or crevices which are difficult to clean and in which foreign matter may accumulate. A motor of this type is shown and described in the patent to Wieseman et al., No. 2,500,971, issued March 21, 1950, which patent also sets forth in some detail the requirements for a sanitary motor and the reasons therefor. It will be obvious that the usual externally mounted junction box cannot be used with a sanitary motor without sacrificing one of the main objectives of such a motor since the resulting corners and pockets would be difficult to keep clean.

It is, therefore, an object of this invention to provide a motor of this type in which the conduit carrying the power supply wires for the motor may be connected directly into the motor shell or housing in a manner precluding the formation of objectionable corners and pockets, and in which a junction box for housing the wiring connections to the motor is formed integrally with the motor shell so as to eliminate the objectionable nooks and crannies which are present when an externally mounted junction box is used.

More particularly it is an object of this invention to provide a junction box of the character described which will comprise an integral portion of the top end bell of a vertically mounted sanitary motor.

Another object of this invention resides in the provision of a top end bell for a vertically mounted sanitary motor which end bell will have a hub-like center providing a junction box for the electrical connections to the motor and also a seat or receptacle for a bearing in which one end of the rotor shaft is journaled.

Still another object of this invention resides in the provision of a junction box for an electric motor which will be integral with one end bell of the motor and wherein the electrical connections for the motor will be readily accessible from the exterior of the motor housing while at the same time the wire conductors leading from the junction box will be so disposed within the housing as to preclude the possibility of their interfering with the moving parts of the motor.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a view partially in side elevation and partially in longitudinal section showing a vertically mounted sanitary motor having the junction box of this invention thereon, the portion in section being taken on the planes of the line I—I in Figure 2; and Figure 2 is a top view of the motor of Figure 1, a portion of the junction box cover plate being cut away.

Referring now more particularly to the accompanying drawing, the numeral 5 indicates generally a vertical sanitary motor having a wound stator 6 which cooperates in a well-known manner with a rotor 7 of any suitable type, the rotor in this instance having its shaft 8 disposed vertically so that the motor may be mounted at the top of a machine (not shown) which is to be driven thereby.

The stator and rotor are enclosed within a shell or housing, designated generally by the numeral 9, and it will be observed that this housing conforms to the requirements for sanitary motors in that it has no small corners or crevices in which dirt and vermin may accumulate. However, consistently with the ordinary practice in the construction of electric motors, the housing is formed in three sections, each so designed as to readily lend itself to production as a casting. The uppermost and lowermost of these sections comprise, respectively, an upper end bell 10 and a lower end bell 11; while the center section of the housing comprises a substantially cylindrical or barrel-shaped member 12. In this instance the lower end bell has a flat bottom wall, the outer edge of which has a reduced diameter to define a shoulder 11' which facilitates mounting the motor on the top of a machine. Interengaging shoulders 13 at the junctions of the three housing sections insure alignment therebetween; and elongated screws 14 having their heads engaged with external bosses 15 on the upper end bell pass through aligned holes in the upper end bell and the cylindrical center member to thread into tapped holes in internal bosses 16 on the lower end bell and tie the three housing sections together.

The upper end bell of this invention is distinguished by a hollow hub-like upward extension 17 at its center, comprising a pair of integral concentric cup-like shells, one of which opens upwardly and provides a junction box 18 and the other of which opens downwardly and provides a receptacle or seat 19 for a bearing 20 in which the upper end portion of the rotor shaft 8 is journaled. These two cup-like shells may be said to be disposed back-to-back and to define oppositely opening wells, having a common bottom wall 21. A passage 22 through this common wall communicates the interior of the junction box with the interior of the bearing seat to enable the bearing to be lubricated without the necessity for disassembling the motor. A press-fitted cap 23 closes the passage and prevents lubricant from working up into the junction box.

The upper or end wall 24 of the top end bell merges into the upper cup-like shell (i. e., the junction box 18) about halfway up the side wall of the latter, or in other words the side walls of the junction box extend partly above and partly below the end wall 24 of the end bell. Consequently a pair of diametrically opposite apertures 25 and 25' in the junction box, each disposed partly in the side wall and partly in the bottom wall of the cup, communicate the interior of the cup with the interior of the motor housing and enable the conductor wires 26 and 27 from the power supply line and the motor winding, respectively, to enter the junction box to be spliced or otherwise connected to one another, as at 28.

A boss 29 at the side of the upper end bell is provided with a suitably threaded port in which the end of a conduit 36 may be received. It will be seen that the provision of the boss 29 tends to "streamline" the junction between the conduit and the motor housing and at the same time thickens the end bell shell at this point to reinforce the conduit connection. As best seen in Figure 2, the port in the boss 29 is aligned with the aperture 25 in the junction box, so that the power supply conductors 26 carried by the conduit can pass directly from the conduit, through the interior of the top end bell, into the junction box, to connect with the stator winding leads 27.

By reason of the fact that the apertures 25 and 25' are disposed at diametrically opposite sides of the junction box, the conductor wires 26 and 27 are carried over the upper end of the rotor shaft 8 and are so disposed that they are held well clear of any part of the rotor, thus precluding the possibility of these wires engaging the moving part of the motor.

The junction box is closed by a flat circular cover plate 30, preferably provided with a suitable gasket 31, and detachably secured in place by screws 32 threaded into holes in internal bosses 33 extending downwardly along the side walls of the junction box.

From the foregoing description, taken together with the accompanying drawing, it will be readily apparent that this invention provides a junction box for a sanitary motor which may be readily cast as an integral part of an end bell comprising part of a motor housing without necessitating complicated coring in the casting operation, and that the structure of this invention is especially useful on sanitary motors, particularly those of the vertically mounted type.

What I claim as my invention is:

1. An electric motor of the type having a rotor and stator confined in a housing including opposite end bells, and a rotor shaft journalled in bearings carried by said end bells; characterized by the fact that one of said end bells has means formed integrally therewith providing a pair of inner and outer cup-like members coaxial of the rotor shaft and disposed back to back so as to have a common bottom wall substantially normal to the axis of the rotor shaft and overlying said end thereof, the side wall of the inner cup-like member extending axially inwardly from said common bottom wall and encircling said end of the rotor shaft in spaced relation thereto to provide a seat for the bearing in which said end of the rotor shaft is journalled, and the side wall of the outer cup-like member extending both axially inwardly and outwardly from the adjacent portions of said end bell and defining conjointly with said bottom wall a junction box to house the connections between electrical conductors connecting the motor windings with a source of current, and said outer cup-like member being apertured at areas thereof inside the end bell to communicate the interior of the junction box with the interior of the housing so as to enable electrical conductors to extend from the junction box to the motor windings in the interior of the housing.

2. An electric motor of the type having a housing containing an upright rotor and a stator encircling the rotor with the opposite ends of the rotor shaft journalled in bearings carried by top and bottom end bells on the housing; characterized by the fact that the bottom end bell has a flat exterior surface substantially normal to the axis of the rotor shaft to provide for mounting the motor in a position with the rotor shaft vertical; and further characterized by the fact that the top end bell has means formed integrally with the central portion thereof and providing an outer cup-like member having its side wall concentric with the axis of the rotor shaft and extending both axially inwardly and outwardly from the adjoining portions of the top end bell, the bottom of said outer cup-like member overlying the upper end of the rotor shaft and being disposed substantially normal to the axis thereof, and a smaller inner cup-like member having its side wall coaxial with the axis of the rotor shaft and extending inwardly of the housing from the bottom of the outer cup-like member to encircle the upper end of the rotor shaft in spaced relation thereto so as to provide a seat for the bearing in which the upper end of the rotor shaft is journalled, the outer cup-like member providing a junction box to house the connections between electrical conductors connecting the motor windings with a source of current, and the inner portions of the wall of said outer cup-like member being apertured to communicate the interior of the junction box with the interior of the housing to enable electrical conductors to extend from the junction box to the motor windings; and a plate detachably connected across the rim portion of said outer cup-like member to enclose the electrical connections therein.

3. The electrical motor set forth in claim 2 wherein the inner portion of the outer cup-like member has diametrically opposite apertures therein to receive electrical conductors, and wherein said end bell has an aperture therein opening to the side of the motor housing substantially in line with one of said apertures in the outer cup-like member and through which electrical supply conductors may enter the interior of the motor housing and said junction box.

RUSSELL I. ROBINSON.

REFERENCES CITED

The following references are of record in the file of this patent:

UNITED STATES PATENTS

| Number | Name | Date |
| --- | --- | --- |
| 1,411,712 | Diehl | Apr. 4, 1922 |
| 2,158,145 | Oster | May 16, 1939 |
| 2,281,711 | Peck | May 5, 1942 |